United States Patent [19]

König et al.

[11] Patent Number: 5,219,893

[45] Date of Patent: Jun. 15, 1993

[54] PROCESS FOR THE PRODUCTION OF OPEN-CELL, COLD-FORMABLE RIGID POLYURETHANE FOAMS AND THEIR USE FOR THE PRODUCTION OF MOLDED ARTICLES

[75] Inventors: Eberhard König, Cologne; Christian Weber, Leverkusen, both of Fed. Rep. of Germany

[73] Assignee: Bayer Aktiengesellschaft, Leverkusen, Fed. Rep. of Germany

[21] Appl. No.: 640,457

[22] Filed: Jan. 11, 1991

[30] Foreign Application Priority Data

Jan. 18, 1990 [DE] Fed. Rep. of Germany ....... 4001249

[51] Int. Cl.$^5$ ..................... C08G 18/18; C08G 18/42; C08J 9/08; B29C 51/02
[52] U.S. Cl. .................................. 521/129; 521/160; 521/173; 521/176; 264/241; 264/257
[58] Field of Search ............... 521/173, 160, 129, 176; 264/257, 241

[56] References Cited

U.S. PATENT DOCUMENTS

| | | | |
|---|---|---|---|
| 3,288,732 | 11/1966 | Chapman et al. | 521/173 |
| 3,467,605 | 9/1969 | Abercrombie et al. | 521/173 |
| 3,591,532 | 7/1971 | Abercrombie et al. | 521/173 |
| 3,748,288 | 7/1973 | Winkler et al. | 521/173 |
| 3,920,587 | 11/1975 | Watkinson | 521/131 |
| 4,021,379 | 5/1977 | Chaya et al. | 521/173 |
| 4,080,416 | 3/1978 | Howard | 264/257 |
| 4,129,697 | 12/1978 | Schapel et al. | 521/176 |
| 4,159,361 | 6/1979 | Schupack | 264/257 |
| 4,241,131 | 12/1980 | Bailey | 264/257 |
| 4,323,657 | 4/1982 | Mazanek et al. | 521/173 |
| 4,374,935 | 2/1983 | Decker et al. | 521/173 |
| 4,474,635 | 10/1984 | Adams | 264/257 |
| 4,508,774 | 4/1985 | Grabhoefer et al. | 428/220 |
| 4,540,768 | 9/1985 | Speranza et al. | 521/173 |
| 4,575,520 | 3/1986 | Kapps et al. | 521/107 |
| 4,595,705 | 6/1986 | Werner et al. | 521/173 |
| 4,595,711 | 6/1986 | Wood | 521/173 |
| 4,642,319 | 2/1987 | McDaniel | 521/173 |
| 4,644,019 | 2/1987 | McDaniel | 521/173 |
| 4,652,591 | 3/1987 | Londrigan | 521/173 |
| 4,692,199 | 9/1987 | Kozlowski et al. | 264/257 |
| 4,727,095 | 2/1988 | Konig et al. | 521/166 |
| 4,863,976 | 9/1989 | Nichols et al. | 521/137 |
| 4,873,045 | 10/1989 | Fujita et al. | 264/257 |
| 5,063,253 | 11/1991 | Gansen et al. | 521/173 |
| 5,070,115 | 12/1991 | Welte et al. | 521/173 |

FOREIGN PATENT DOCUMENTS 294110  12/1988  European Pat. Off. .

*Primary Examiner*—John Kight, III
*Assistant Examiner*—Rabon Sergent
*Attorney, Agent, or Firm*—Joseph C. Gil; Lyndanne M. Whalen

[57] ABSTRACT

Open-celled, cold-formable polyurethane foams are made by reacting a specific crude MDI with a polyol component which includes hydroxyl polyethers having an OH number of from about 28 to about 600, a difunctional phthalic acid hydroxyl polyester having an OH number of from about 150 to about 440, glycerol, a blowing agent (water is preferred), a tertiary amine catalyst and optionally a silicone foam stabilizer. These foams generally have a density of from about 23 to about 30 kg/m$^3$ and may be molded into articles having intricate shapes (e.g., roof for automobiles) using known cold-forming techniques.

10 Claims, No Drawings

PROCESS FOR THE PRODUCTION OF OPEN-CELL, COLD-FORMABLE RIGID POLYURETHANE FOAMS AND THEIR USE FOR THE PRODUCTION OF MOLDED ARTICLES

BACKGROUND OF THE INVENTION

This invention relates to cold-formable, open-celled rigid polyurethane foams, a process for their production and to the use of such foams to make molded articles such as parts for automobiles.

The expression "cold-formable" as used herein means that the foam sheet is not heated before molding, but is instead placed in a heated mold at room temperature and molded shortly afterwards. The heating effect which spreads from the mold to the foam at the moment of molding is negligible because the foam is surrounded sandwich-fashion on both sides by a glass mat and a surface layer and by the adhesive applied to each of these flat materials. The foam is therefore shielded from the hot mold (130° C.) during the closing process.

Rigid polyurethane foams which are heated before molding are known and are described, for example, in German Offenlegungsschriften 2,607,380 and 3,610,961.

Published European Patent Application 0,118,876 describes flexible to semirigid polyurethane foams which are taught to be suitable both for thermoforming and for cold forming. The fact that these foams may be cold-formed is not surprising because they are extremely soft and flexible. This softness and flexibility is attributable to the use of formulations where only 50 to 100 parts by weight MDI (i.e., diphenylmethane diisocyanate) are used for each 100 parts by weight of the described polyol formulations.

The softness of foams such as those described in European Patent Application 118,776 makes it impossible for them to be readily processed to produce car headliners using only glass mats, surface layers and thinly applied adhesive films. When the hot mold is opened, the composite of foam and the supporting (i.e., glass mat) and decorative (i.e., surface) layers bonded thereto is so soft that it cannot be removed from the mold without damage. Consequently, soft foams such as those disclosed in European Patent Application 118,776 could not be used on a semi-automated production line for the production of a few thousand car roofs per day.

The inventors of the foams disclosed in European Patent Application 118,776 recognized this deficiency of soft foams and attempted to offset this disadvantage by enveloping the foam core in unsaturated polyester resin prepreg mats so that the inadequate supporting function of the foam would be compensated by a relatively hard shell construction. However, it is well known that unsaturated polyester resin prepreg mats can cause physiological/ecological problems due to the evaporation of unreacted styrene.

Another disadvantage of foams such as those described in European Patent Application 118,776 lies in their high resilience. These foams are so elastic that they cannot be durably embossed or compressed because the compressed foam expands again. This is undesirable for decorative and design reasons because, for example, the compressed rim of a car roof must retain its narrow cross section to fit into the narrow gap provided in the pillar trim.

SUMMARY OF THE INVENTION

It is an object of the present invention to provide a rigid foam which is cold formable and can be processed and removed from a mold without detrimentally affecting the appearance and strength of the molded product.

It is also an object of the present invention to provide a cold formable rigid foam which will retain its shape after being removed from the mold.

It is another object of the present invention to provide a process for the production of cold formable open-celled rigid polyurethane foams.

It is a further object of the present invention to provide a process for cold forming polyurethane foams to produce molded articles such as car headliners and interior trim for automobiles.

These and other objects which will be apparent to those skilled in the art are accomplished by reacting a polyisocyanate or mixture of polyisocyanates in which at least 70% by weight of the total polyisocyanate is a diphenylmethane diisocyanate with a polyol component in which (a) at least 50% of the total polyol mixture is a difunctional, trifunctional or mixture of a difunctional and trifunctional hydroxyl polyether having an OH number of from about 28 to about 600, (b) at least 20% by weight of the total polyol component is a difunctional phthalic acid hydroxyl polyester having an OH number of from about 150 to about 440, (c) at least 2% by weight of the total polyol component is glycerol, (d) from about 3,5 to about 7% weight of the total polyol component is a blowing agent such as water, (e) optionally at least 0.1% by weight of the total polyol component is silicone foam stabilizer and (f) at least 0.3% by weight of the total polyol component is a catalyst to form an open-celled polyurethane foam. The resultant foam may then be cold formed in accordance with known techniques.

DETAILED DESCRIPTION OF THE PREFERRED EMBODIMENTS OF THE INVENTION

The present invention provides a rigid polyurethane foam characterized by good cold formability, its ability to provide sufficient support for automobile parts such as headliners, its low density (approximately 23 to 30 kg/m$^3$) and good cohesion.

This combination of properties is achieved by reacting a specified polyisocyanate or mixture of polyisocyanates with a polyol mixture having the specified components.

More specifically, in the process of the present invention, open-celled, cold-formable rigid polyurethane foams are obtained by reacting the specified polyisocyanates with a polyol component which is made up of compounds containing at least two hydroxyl groups and having a molecular weight of from about 187 to about 10,000, chain extending agents and crosslinking agents containing at least two hydroxyl groups and having a molecular weight of 32 to 186, water, tertiary amine catalysts and silicone foam stabilizers. The polyisocyanate employed in the process of the present invention is preferably a mixture of diphenyl methane diisocyanates and polyphenyl polymethylene polyisocyanates in which from about 70 to about 90% by weight of the total polyisocyanate is a diphenyl methane diisocyanate and from about 10 to about 30% of the total polyisocyanate is a polyphenyl polymethylene polyisocyanate. it is particularly preferred that from about 12 to about 30% by weight of the diphenyl methane diisocyanate be 2,4'-diphenyl methane diisocyanate. A diisocyanate mixture in which from about 15 to about 25% by weight of the diphenyl methane diisocyanate is 2,4'-diphenyl methane diisocyanate is most preferred.

The polyol mixture of the present invention is composed of from about 50 to about 70% by weight of the total polyol mixture of a difunctional, trifunctional or mixture of di- and tri-functional hydroxyl polyethers having an OH number of from about 28 to about 600 (these OH numbers correspond to a molecular weight of from about 187 to about 6,000 determined by the end group analysis method), from about 20 to about 35% by weight of the total polyol component is a difunctional phthalic acid hydroxyl polyester having an OH number of from about 150 to about 440 (these OH numbers correspond to a molecular weight of from about 254 to about 747 using the end group analysis method), from about 2 to about 10% by weight of the total polyol component is glycerol, from about 3,5 to about 7% by weight of the total polyol component is water, optionally from about 0.1 to about 2% by weight of the total polyol component is a silicone foam stabilizer and from about 0.3 to about 1% by weight of the total polyol component is an incorporable tertiary amine catalyst.

The present invention also relates to the use of the polyurethane open-celled, cold-formable rigid foams produced by this process for the production of automobile parts such as car headliners.

Examples of difunctional hydroxyl polyethers having an OH number of from about 28 to about 600 which may be used in the polyol component of the present invention include the difunctional polyethers obtainable by reaction of ethylene oxide and/or propylene oxide with glycols such as ethylene glycol, diethylene glycol, 1,2- or 1,3-propylene glycol, butane-1,4-diol, etc. Polypropylene oxides and/or polyethylene oxides having an OH number in the specified range, preferably in the range of from about 150 to about 500 (corresponding to a molecular weight of from about 224 to about 747 as determined by the end group analysis technique) are examples of other suitable difunctional polyethers. These shortchained polyethers are preferably used in quantities of from about 0 to about 16% by weight, based on the total polyol component.

Trifunctional hydroxyl polyethers having an OH number of from about 28 to about 600 which may be employed in the polyol component of the present invention include the trifunctional polyethers obtainable by reaction of ethylene oxide or propylene oxide with trihydric alcohols such as glycerol, trimethylol propane, etc. These polyethers generally have an OH value of 28 to 600 which corresponds to a molecular weight of from about 280 to about 6,000 as determined by the end group analysis method.

A preferred mixture of difunctional and trifunctional hydroxyl polyethers is composed of from about 25 to about 35% by weight, based on the total polyol component of a shortchained polypropylene oxide trimethylol propane (TMP) polyether having an OH number in the range of from about 500 to about 600 with from about 20 to about 35% by weight, based on the total polyol component of a long chain poly(propylene/ethylene oxide) TMP polyether having an OH number in the range of from about 28 to to about 34. Polyethers of the latter type also include filler-containing polyethers which contain approximately 20% by weight of a solid styrene/acrylonitrile copolymer grafted on or approximately 20% by weight of a solid reaction product of tolylene diisocyanate (TDI) and hydrazine in dispersed form.

Difunctional phthalic acid polyesters having an OH number in the range of from about 150 to about 440 which may be included in the polyol component of the present invention may be obtained by esterification of phthalic anhydride with ethylene glycol, propylene glycol, diethylene glycol, etc. It is preferred to use from about 20 to about 30% by weight, based on the total polyol component, of such an ester which has been formed by esterification of the phthalic anhydride with diethylene glycol and ethylene oxide having an OH number of about 290 (corresponding to a molecular weight of about 386 as determined by the end group analysis method).

Glycerol is used as a cell regulator in a quantity of from about 2 to about 10% by weight and preferably from about 4 to about 6% by weight, based on the total polyol component. This trihydric alcohol does not act as a branching agent, but surprisingly promotes the open-celled character of the foam produced by the process of the present invention. Analogous known branching agents, such as trimethylol propane, for example, do not promote the open-celled character of the foams produced in accordance with the present invention.

Water is included as a blowing agent in the polyol component in quantities of from about 3,5 to about 7% by weight and preferably in quantities of from about 3,5 to about 6% by weight, based on the total polyol component.

The silicone foam stabilizers optionally included in the polyol component of the present invention are known and are preferably of the type having a relatively short polyether group and a relatively long silicone group. A specific example of a suitable silicone stabilizer is sold under the name Polyurax SR 271 and is available from BP Chemicals. The silicone foam stabilizer is usually used in a quantity of from about 0.1 to about 2.0% by weight, based on the total polyol component.

The catalyst used is an incorporable tertiary amine which preferably contains hydroxyl groups. As used herein, "incorporable tertiary amine" means a tertiary amine having at least one substituent which is an isocyanate reactive group and a second substituent which is a group that catalyzes the reaction of isocyanate groups to urethane groups. An example of such an incorporable tertiary amine is N,N,N'-trimethyl-N'-hydroxyethyl ethylenediamine. Dimethyl ethanolamine is a particularly preferred incorporable tertiary amine catalyst. These tertiary amine catalysts are preferably used in quantities of from about 0.4 to about 1.0% by weight, based on the total polyol component.

The polyisocyanate component is a crude MDI in which the fraction containing 2 nuclei makes up from about 70 to about 90% by weight (of which from about 12 to about 30% by weight and preferably from about 15 to about 25% by weight is 2,4'-diphenyl methane diisocyanate) and the fraction containing three or more nuclei makes up from about 10 to about 30% by weight. The fraction containing more than 4 nuclei is preferably present in an amount of no more than 3% by weight.

An MDI having the following fractions is particularly preferred:

| | | |
|---|---|---|
| 2-nuclear content: | 74% by weight | (total) |
| | 52% by weight | diphenyl methane 4,4'-diisocyanate |
| | 19% by weight | diphenyl methane-2,4'-diisocyanate |
| | 3% by weight | diphenyl methane-2,2'-diisocyanate |
| 3- + 4-nuclear content: remainder (more than four nuclei): | 23% by weight | |
| | 3% by weight | |
| TOTAL | 100% by weight | |

Other known auxiliaries and additives may, of course, also be used in the production of foams in accordance with the process of the present invention. Examples of such optional additives include readily volatile organic substances which act as blowing agents; known reaction accelerators; known reaction retarders; surface-active additives, such as emulsifiers and foam stabilizers; known cell regulators such as paraffins, fatty alcohols and dimethyl polysiloxanes; pigments or dyes; known flameproofing agents such as trischloroethyl phosphate and tricresyl phosphate; stabilizers against the effects of ageing and weathering; plasticizers; fungistatic and bacteriostatic agents; and fillers such as barium sulfate, kieselguhr, carbon black and whiting. These optional additives may be used in their typically used quantities.

Specific examples of appropriate optional auxiliaries and additives are described, for example, in German Offenlegungsschrift 27 32 292, pages 21 to 24.

Further examples of surface-active additives and foam stabilizers, cell regulators, reaction retarders, stabilizers, flameproofing agents, plasticizers, dyes, fillers, fungistatic and bacteriostatic agents which may optionally be used in the process of the present invention and information on the use of such additives and their mode of action can be found in Kunststoff-Handbuch, Vol. VII, edited by Vieweg and Höchtlen, Carl-Hanser-Verlag, Munchen 1966, for example on pages 103 to 113.

The foam produced in accordance with the present invention is produced by mixing the polyol component with the polyisocyanate component, generally in a ratio by weight of of polyol to isocyanate of from about 100:170 to about 100:200 and preferably in a ratio by weight of approximately 100:180. This mixing is typically carried out in a low-pressure foaming machine such as that which is available from under the designation Cannon C 300. A foam slab is produced discontinuously by pouring the foamable mixture into a large box having a base area which corresponds to that of the article to be formed therefrom, e.g., a car roof. The foams produced in accordance with the present invention generally have a density of from about 23 to about 30 kg/m$^3$ and preferably about 28 kg/m$^3$. Approximately 50 kg of the polyurethane-forming reaction mixture are required for the production of a foam slab measuring 180×140×70 cm$^3$. The foamable mixture is activated so that the foaming reaction begins after about 60 seconds, as measured from the emergence of the first amount from the mixing head (cream time). After about 200 seconds, the foam sets and, after about 260 seconds, the blow-out process begins, i.e. the sudden evaporation of a mixture of steam and $CO_2$, leaving a number of small craters on the surface of the slab. This blow-out process is the outward sign that the foam cells have opened.

The foams produced in accordance with the process of the present invention is an open-celled foam (75–94% by volume, ASTM-D-1940-42T) which is elastic and formable at room temperature. These foams may be used for the production of car roofs and glove compartments having complicated shapes. The foams of the present invention have glass transition temperatures of approximately 150° C. and, hence, high heat resistance. These foams are sufficiently rigid that the warm moldings can be removed without damage from the mold which has been heated at 130° to 140° C. In addition, the foams have almost no resilience, so that edges which are tightly compressed to different extents retain their cross-section. This compression retention ensures an exact fit of the parts required during installation.

Particulars of a preferred foam formulation and of processing both to the foam and to car headliners and the physical properties of the resultant foam are given in the following Examples.

EXAMPLES

Example 1

(A) Formulation

| POLYOL COMPONENT 1 | |
|---|---|
| 33.3 parts by weight | of a trimethylol propane-started propylene oxide/ethylene oxide polyether, OH number 28 |
| 29.0 parts by weight | of a trimethylol propane-started propylene oxide polyether, OH number 550 |
| 25.0 parts by weight | of a phthalic acid/diethylene glycol/ethylene glycol polyester, OH number 290 |
| 6.0 parts by weight | glycerol, OH number 1825 |
| 4.6 parts by weight | water, calculated OH number 6222 |
| 0.5 part by weight | dimethyl ethanolamine, OH number 630 |
| 1.6 parts by weight | silicone foam stabilizer (Polyurax SR 271, a product of BP Chemicals) |

| POLYISOCYANATE COMPONENT 1 | |
|---|---|
| 180.0 parts by weight | of a polyphenyl polymethylene polyisocyanate (crude MDI) having a binuclear content of approximately 74% in which the diphenyl methane 2,4'-diisocyanate isomer content is approximately 19%, an NCO content of 31.5% and a viscosity at 25° C. of approximately 40 mPa.s. |

100.0 parts by weight of POLYOL COMPONENT 1 (including the water) had a mixed OH number of 640. 100.0 parts of POLYOL COMPONENT 1 were combined with 180.0 parts by weight of POLYISOCYANATE COMPONENT 1. When the total water content was stoichiometrically included, the index (i.e., the ratio of isocyanate to hydroxyl groups) was 120.

B) Production and properties of the cold-formable rigid polyurethane foam

Quantities of approximately 150 kg of the POLYOL COMPONENT 1 and POLYISOCYANATE COMPONENT 1 were introduced into the appropriate containers of a Cannon C 300 low-pressure foaming machine (material temperature 25° C.). In accordance with the predetermined ratio of polyol to MDI of 100:180, the dosage was geared to an output of 49,200 g per minute polyol and 88,560 g per minute MDI. A box (length x width x height: 170×130×100 cm²) was filled with the thoroughly mixed mixture of polyol and MDI for exactly 21 seconds, so that 17,220 g of POLYOL COMPONENT 1 and 30,996 g of POLYISOCYANATE COMPONENT 1 were introduced. The mixture began to foam about 66 seconds after the beginning of the filling process (cream time); the foam set after 190 seconds (gel time) and, after about 220 seconds, underwent sudden expansion (blow-out time) so that numerous small craters were formed over the surface of the foam. The foam slab had a height of approximately 60 cm and a density of approximately 27 g/l. After 20 minutes, the foam slab was demolded, stored for about 2 days to cool and then trimmed and cut into 1 cm thick sheets.

The resultant foam had the following properties: Open cells (as measured in accordance with ASTM-D 1940-42T) 90% by volume

| Compression test (DIN 53421) | |
|---|---|
| 0.19 MPa (parallel to foaming direction) | |
| 0.11 MPa (perpendicular to foaming direction) | |
| Three-point bending test (DIN 53423) | |
| outer fiber strain | 24% |
| flexural strength at break | 0.20 MPa |
| Tensile test (DIN 53430) | |
| elongation at break | 24% |
| tear strength | 0.26 MPa |
| tensile strength | 0.26 MPa |
| Glass transition temperature Tg (DIN 53445-86) | 155° C. |

These mechanical values indicate that this rigid foam was both flexible and elastic. After forming in a cold mold, the compressed parts of the foam remained more or less compressed, even in the event of heat ageing at 110° C., so that the molding remained contour-stable.

C) Processing to car headliners

The 1 cm thick rigid polyurethane foam sheet produced in Section B above was enclosed sandwich fashion between two glass mats. A solventless two-component polyurethane adhesive was sprayed onto the glass mats beforehand (approx. 120 g/m2). The glass mats were then covered on one side with a decorative film, back facing the glass mat, and on the other side with a textile fabric. This loose assemblage of five layers (disregarding the adhesive) was placed in a mold heated to approximately 130° C. The mold core which was no warmer than room temperature was formed at the moment the mold closed. The residence time in the mold was one minute. During this time, the heat of the mold cured the adhesive. The finished can headliners was removed from the mold. After it was stamped, it was ready for fitting.

The car headliners in this way had a heat resistance of 130° C. (test temperature). No unevenness was noticeable on the surface of the only lightly compressed parts of the roof.

Example 2

A) Formulation

| POLYOL COMPONENT 2 | |
|---|---|
| 28.00 parts by weight | of a trimethylol-propane-started propylene oxide polyether, OH number 550 |
| 21.00 parts by weight | of a trimethylol-propane-started propylene oxide/ethylene oxide (78%/22%) polyether, OH number 28 |
| 15.77 parts by weight | of a 1,2-propylene-glycol-started ethylene oxide polyether, OH number 180 |
| 25.00 parts by weight | of a phthalic acid/diethylene glycol/ethylene glycol polyester, OH number 290 |
| 4.55 parts by weight | glycerol, OH number 1825 |
| 4.55 parts by weight | water, calculated OH number 6222 |
| 0.50 part by weight | dimethyl ethanolamine, OH number 630 |
| 0.63 part by weight | Polyurax SR 234, (a product of BP Chemicals) |
| 100.0 parts by weight | of POLYOL COMPONENT 2, mixed OH number 630 (including water) |

| POLYISOCYANATE COMPONENT 2 | |
|---|---|
| 180.0 parts by weight | of a polyphenyl polymethylene polyisocyanate (crude MDI) having approximately 74% and a diphenyl methane-2,4'-diisocyanate content of approximately 19%, an NCO content of 31.5% and a viscosity at 25° C. of approximately 40 mPa.s. |

100.0 parts by weight of POLYOL COMPONENT 2 were reacted with 180.0 parts by weight of POLYISOCYANATE COMPONENT 2. When the total water content was included, the index (i.e., NCO to OH ratio) was 118.

B) Production and properties of the cold-formable polyurethane foam

A foam was produced by reacting 100.0 parts by weight of POLYOL COMPONENT 1 with 180 parts by weight of POLYISOCYANATE COMPONENT 2 in the same manner as described in Example 1 B with the following reaction times:

| Cream time: | approx. 58 secs. |
|---|---|
| Gel time: | approx. 206 secs. |
| Blow-out time: | approx. 250 secs. |
| The properties of the resultant foam were as follows: | |
| Density (DIN 53420) | approx. 28 kg/m³ |
| Open cells (ASTM-D 1940-42T) | approx. 92% by volume |
| Compression test (DIN 53421) | |
| 0.18 MPa (parallel to foaming direction) | |
| 0.11 MPa (perpendicular to foaming direction) | |
| Three-point bending test (DIN 53423) | |
| outer fiber strain | 23.8% |
| flexural strength at break | 0.21 MPa |
| Tensile test (DIN 53430) | |
| elongation at break | 25% |
| tear strength | 0.29 MPa |
| tensile strength | 0.29 MPa |
| Glass transition temperature Tg | 150° C. |

Example 3

A) Formulation

| POLYOL COMPONENT 3 | |
|---|---|
| 29.0 parts by weight | of a trimethylol propane-started propylene oxide/ethylene oxide polyether, OH number 28, in which 20% by weight styrene/acrylonitrile copolymer were dispersed |
| 25.0 parts by weight | of a trimethylol propane-started propylene oxide polyether, OH number 550 |
| 25.0 parts by weight | of a phthalic acid/diethylene glycol/ethylene glycol polyester, OH number 290 |
| 8.3 parts by weight | of a 1,2-propylene-glycol-started ethylene oxide polyether, OH number 180 |
| 6.0 parts by weight | glycerol, OH number 1825 |
| 4.6 parts by weight | water, calculated OH number 6222 |
| 0.5 part by weight | dimethyl ethanolamine, OH number 630 |
| 1.6 parts by weight | silicone foam stabilizer (Polyurax SR 271, a product of BP Chemicals) |
| 100.0 parts by weight | of POLYOL COMPONENT 3, mixed OH value 630 (including water) |

| POLYISOCYANATE COMPONENT 3 | |
|---|---|
| 180.0 parts by weight | of a polyphenyl polymethylene polyisocyanate (crude MDI) having a binuclear content of approximately 74% and a diphenyl methane-2,4'-diisocyanate content of approximately 19%, an NCO content of 31.5% and a viscosity at 25° C. of approximately 40 mPa.s. |

100.0 parts by weight of POLYOL COMPONENT 3 were reacted with 180.0 parts by weight of POLYISOCYANATE COMPONENT 3. When the total water content was stoichiometrically included, the index (i.e., ratio of isocyanate to hydroxyl groups) was 120.

B) Production and properties of the cold-formable polyurethane foam 100.0 parts by weight of POLYOL COMPONENT 3 were reacted with 180.0 parts by weight of POLYISOCYANATE COMPONENT 3 in accordance with the procedure described in Example 1 B. The reaction times were as follows:

| | |
|---|---|
| Cream time: | approx. 55 secs. |
| Gel time: | approx. 170 secs. |
| Blow-out time: | approx. 220 secs. |

The properties of the resultant foam were as follows:

| | |
|---|---|
| Density (DIN 53420) | approx. 28 kg/m³ |
| Open cells (ASTM-D 1940-42T) | approx. 88% by volume |
| Compression test (DIN 53421) | |
| 0.18 MPa (parallel to foaming direction) | |
| 0.11 MPa (perpendicular to foaming direction) | |
| (DIN 53445-86) | |
| Three-point bending test (DIN 53423) | |
| outer fiber strain | 23% |
| flexural strength at break | 0.23 MPa |
| Tensile test (DIN 53430) | |
| elongation at break | 20.2% |
| tear strength | 0.28 MPa |
| tensile strength | 0.28 MPa |
| Glass transition temperature Tg (DIN 53445-86) | 150° C. |

This foam could be cold-formed, embossed and processed to produce car headliners by the method described in Example 1C).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an open-celled, cold formable rigid polyurethane foam comprising reacting
   a) a mixture of polyisocyanates which is made up of from about 70 to about 90% by weight diphenyl methane diisocyanate and from about 10 to about 30% by weight polyphenyl polymethylene polyisocyanate with
   b) a polyol component which is made up of
      (1) from about 50 to about 70% by weight of a difunctional and/or trifunctional hydroxyl polyether having an OH value of from about 28 to about 600,
      (2) from about 20 to about 35% by weight of a difunctional phthalic acid hydroxyl polyester having an OH value of from about 150 to about 440,
      (3) from about 2 to about 10% by weight glycerol,
      (4) from about 3.5 to about 7% by weight water,
      (5) from about 0.3 about 1% by weight of an incorporable tertiary amine catalyst and optionally
      (6) from about 0.1 to about 2% by weight of silicone foam stabilizer.

2. The process of claim 1 in which the diphenylmethane diisocyanate includes from about 12 to about 30% by weight of 2,4'-diphenylmethane diisocyanate.

3. The open-called, cold-formable polyurethane foam produced by the process of claim 2.

4. The process of claim 1 in which the diphenylmethane diisocyanate includes from about 15 to about 25% by weight of 2,4'-diphenylmethane diisocyanate.

5. The process of claim 1 in which polyol component b) (1) is a mixture of
from about 25 to about 35% by weight, based on total polyol component b), short chained polypropylene oxide trimethylolpropane polyether having an OH number of from about 500 to about 600 and
from about 20 to about 35% by weight, based on total polyol component b), long-chained poly(propylene/ethylene)oxide trimethylolpropane polyether having an OH number of from about 28 to about 34.

6. The open-celled, cold-formable polyurethane foam produced by the process of claim 2.

7. The process of claim 1 in which the tertiary amine catalyst b)(6) is dimethyl ethanolamine.

8. The open-celled, cold-formable polyurethane foam produced by the process of claim 1.

9. A process for the production of a molded article in which
(a) a five-layered assembly is formed by
(1) sandwiching the open-celled, cold-formable polyurethane foam produced by the process of claim 1 between two glass mats to which an adhesive had been applied,
(2) covering one of the two glass mats with a film,
(3) covering the second of the two glass mats with a textile fabric,
(b) placing the five-layered assembly in a heated mold,
(c) closing the mold and retaining the five-layered assembly therein for a period long enough to cure the adhesive and
(d) removing the molded article from the mold.

10. The process of claim 9 in which the molded article is a headliner for an automobile.

* * * * *

UNITED STATES PATENT AND TRADEMARK OFFICE
CERTIFICATE OF CORRECTION

PATENT NO. : 5,219,893
DATED : June 15, 1993
INVENTOR(S) : Eberhard Konig et al

It is certified that error appears in the above-indentified patent and that said Letters Patent is hereby corrected as shown below:

Title page, item [57], At line 10, delete "roof" and insert --roofs--.

At column 7, line 61, delete "can" and insert --car--.

At column 8, line 30, after "(crude MDI) having", insert --a binuclear content of--.

At column 9, line 65, delete "(DIN 53421)" and insert --(DIN 53423)--.

At column 9, line 66, delete "0.18 MPa" and insert --0.20 MPa--.

At column 9, line 67, delete "0.11 MPa" and insert --0.12 MPa--.

Signed and Sealed this

Twenty-first Day of January, 1997

Attest:

BRUCE LEHMAN

*Attesting Officer*  *Commissioner of Patents and Trademarks*